(12) United States Patent
Law et al.

(10) Patent No.: US 8,781,887 B2
(45) Date of Patent: Jul. 15, 2014

(54) METHOD AND SYSTEM FOR OUT-OF-HOME PROXIMITY MARKETING AND FOR DELIVERING AWARENESS INFORMATION OF GENERAL INTEREST

(76) Inventors: Raymond Ying Ho Law, Vancouver (CA); Christian Losari, Surrey (CA)

( * ) Notice: Subject to any disclaimer, the term of this patent is extended or adjusted under 35 U.S.C. 154(b) by 1806 days.

(21) Appl. No.: 11/986,650

(22) Filed: Nov. 26, 2007

(65) Prior Publication Data

US 2008/0091541 A1    Apr. 17, 2008

(51) Int. Cl.
*G06Q 30/02* (2012.01)
(52) U.S. Cl.
CPC ............ *G06Q 30/02* (2013.01); *G06Q 30/0261* (2013.01); *G06Q 30/0267* (2013.01)
USPC .......................................................... 705/14
(58) Field of Classification Search
USPC .......................................................... 705/14
See application file for complete search history.

(56) References Cited

U.S. PATENT DOCUMENTS

| 6,970,535 | B2 |  | 11/2005 | Gregory et al. | |
|---|---|---|---|---|---|
| 6,993,326 | B2 | * | 1/2006 | Link et al. .................. | 455/414.1 |
| 7,343,317 | B2 | * | 3/2008 | Jokinen et al. ............. | 705/14.64 |
| 7,620,026 | B2 | * | 11/2009 | Anschutz et al. ............. | 370/338 |
| 7,912,484 | B2 | * | 3/2011 | Sohn ......................... | 455/456.3 |
| 7,930,211 | B2 | * | 4/2011 | Crolley ....................... | 705/14.64 |
| 2002/0095333 | A1 | * | 7/2002 | Jokinen et al. .................. | 705/14 |
| 2002/0107027 | A1 | * | 8/2002 | O'Neil .......................... | 455/456 |
| 2002/0138433 | A1 | * | 9/2002 | Black et al. ..................... | 705/43 |
| 2003/0112783 | A1 | * | 6/2003 | Rankin .......................... | 370/338 |
| 2007/0047523 | A1 | * | 3/2007 | Jiang ............................. | 370/352 |
| 2008/0281940 | A1 | * | 11/2008 | Coxhill .......................... | 709/217 |
| 2009/0017749 | A1 | * | 1/2009 | Braun .......................... | 455/3.01 |
| 2010/0332327 | A1 | * | 12/2010 | Yu ............................... | 705/14.64 |

* cited by examiner

*Primary Examiner* — Jessica Lemieux
(74) *Attorney, Agent, or Firm* — Frederick Kaufman Inc

(57) ABSTRACT

The method comprises: programming a plurality of dispersed computer units for receiving and transmitting information from a centralized computer unit independently located with respect to that plurality of computer units, each of the latter being provided with a wireless transceiver, Bluetooth type, for collecting, storing and transmitting ID data from OBEX capable wireless devices situated at range of the computer units; providing a plurality of displaying units, each located adjacent to the plurality of computer units; and programming the centralized computer unit for: receiving the ID data, storing information from sponsors to be displayed on plurality of displaying units and to the wireless devices. General interest information is also send to the former and latter. For carrying out the method the system comprises computer and displaying units and a centralized computerized unit.

1 Claim, 1 Drawing Sheet

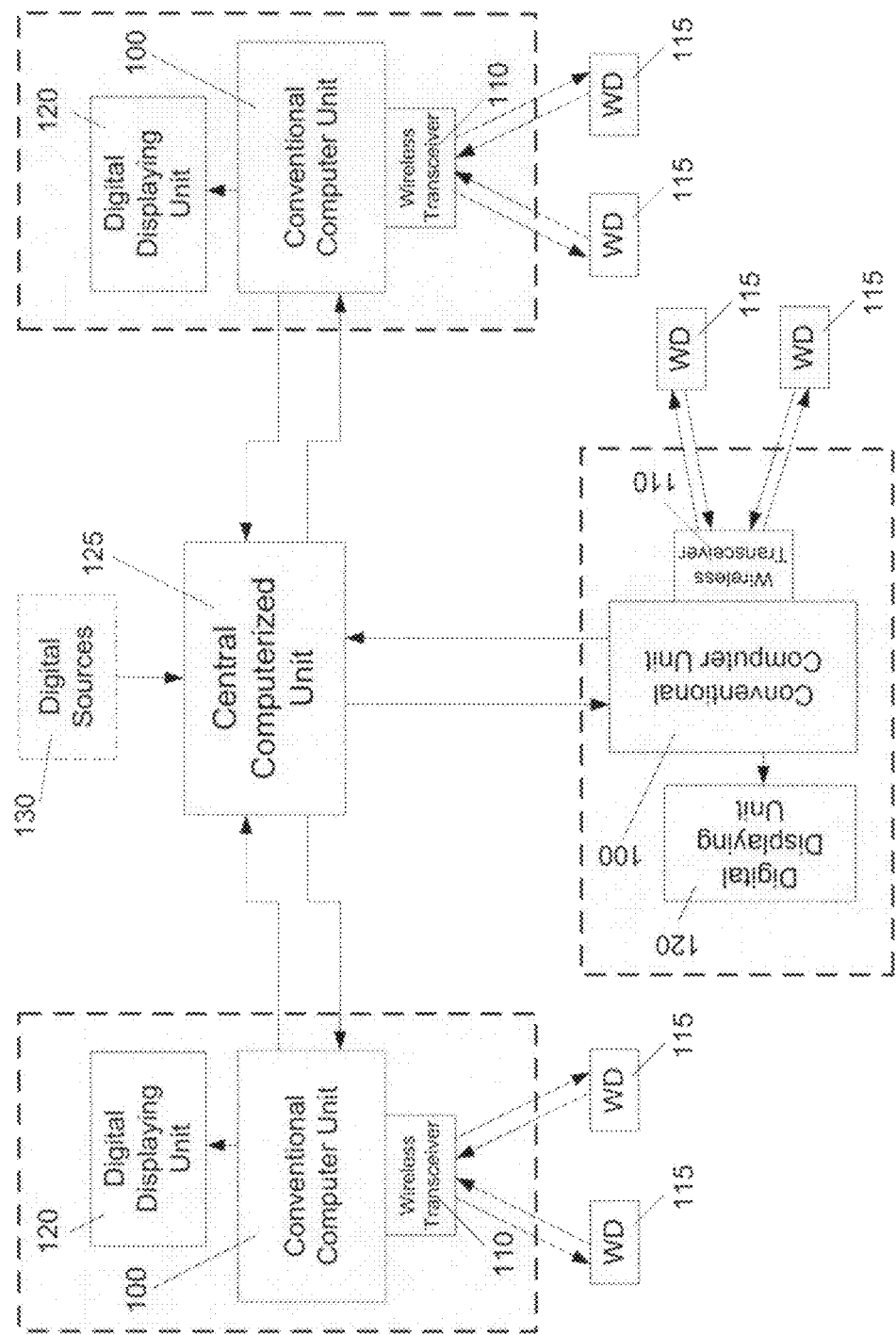

METHOD AND SYSTEM FOR OUT-OF-HOME PROXIMITY MARKETING AND FOR DELIVERING AWARNESS INFORMATION OF GENERAL INTEREST

I. BACKGROUND OF THE INVENTION

1. Field of the Invention

The present invention relates in general to methods and systems for collecting, storing, processing and directing information and, in particular, to a method and system for out-of-home proximity marketing and for delivering awareness information of general interest.

2. Description of the Related Art

Presently, in the digitally connected world, a large segment of the population are using mobile phones and a high percentage of those mobile phones are Bluetooth wireless enabled. Bluetooth marketing allows broadcasting of sales information, promotional messages and other messages directly across a target audience using Bluetooth-enabled devices. Some of the Bluetooth marketing systems detect a Bluetooth enabled device in range, the details of the device such as its unique ID is collected in a database. Providing the discovered device satisfies the transmission criteria, such as OBEX Capable, that device is able to receive OBEX Bluetooth messages. Since sales promotions are available in those devices, the target customers who pass by the premises where the sales take place or close-by those premises can visit the latter. Alternatively, customers can store the sales information in their devices and contact the advertising stores at a later time. This stored sales information can be also readily passed to friends and colleagues.

The target audience can either accept or decline the sales information messages.

The main disadvantage of the foregoing Bluetooth marketing resides in fact that the messages are restricted to customers who are provided with OBEX Capable portable Bluetooth devices. Several Bluetooth marketing systems have been developed. For example, Bloozy, Bluetooth Advertising—Bluetooth Proximity Marketing (http://www.bluetoothadvertising.com) uses a computer system programmed to transmit information to plurality of mobile devices at a range of 100 m. This system has a main disadvantage: it does not include a central computerized unit and a plurality of geographically dispersed displaying units (digital billboards). The essential purpose of the latter is to make aware and persuade the consumers passing in proximity of the displaying units to promptly open their Bluetooth devices. Others, such as Bluush—Bluetooth Proximity Marketing System (http://www.bluush.com) and Outdoor Partner Media (http://www.outdoorpartner.com/ advertise systems that present the same limitation as the aforementioned Bloozy, Bluetooth Advertising—Bluetooth Proximity Marketing system.

II. SUMMARY OF THE INVENTION

There is accordingly a need for an improved method and, impliedly, a system that surmounts the existing shortcomings in out-of-home proximity systems for marketing and for delivering awareness information of general interest.

Thus, there is an objective of the present invention to devise a targeted model oriented towards a public frequenting shopping malls, stadiums, waiting in the airports, using public transport means (air, water, land) etc., which public can be provided or not with Bluetooth-enabled devices.

Another objective of the present invention is to elaborate an integrated, interactive model wherein display units (digital billboards) are provided with computer units that identify Bluetooth-enabled devices situated in their proximity and feed the identification codes of the latter to a central computer; the central computer sends promotional, advertising information to a potential clientele a) which visually and audibly is exposed to a proximate display unit; and/or b) is provided with Bluetooth-enabled devices in range of that proximate display unit.

There is yet another objective of this invention to deliver information in different forms, such as text;
audio;
video;
still images;
animated images;
calendar events; and
business cards.

The is another objective of the present invention to devise a method and system for out-of-home proximate marketing wherein the operational cost for transmitting information does not depend on the number of display units and the number of Bluetooth-enabled devices in range of those display units.

Based on the foregoing objectives, the inventors developed and tested an integrated solution which broadly comprises:

A system for out-of-home proximity marketing and for delivering awareness information of general interest, which comprises:

A. A plurality of computer units (of conventional type, or custom built to satisfy the requirements of system), geographically dispersed in a plurality of zones with relatively high number of transient people, i.e. in high traffic zones such as shopping malls, stadiums, airports, on public transportation means, etc.
   a. each of the plurality of computer units is programmed to receive and transmit information fed by a central source (further disclosed), away from the above geographically dispersed locations; and
   b. each of the plurality of computer units being provided with a wireless transceiver, such as Bluetooth or alike, is capable to collect, store and transmit wireless ID data from users of a multiplicity of wireless devices, such as mobile phones, personal digital (PDAs), portable computers etc., each of them being OBEX or similar protocol Capable and situated in a surrounding area of each of the plurality of computer units;
B. A plurality of digital displaying units located outdoor or indoor in proximity of the plurality of computer units. Each one of the plurality of digital displaying units is essentially constituted by a relatively large digital billboard, such as, for example, a large high definition LCD or alike and is connected to an adjacent one of the plurality of computer units;
   The plurality of computer units is so programmed as to identify and collect wireless ID data from the users of wireless devices;
C. A central computerized unit located apart from the plurality of computer units and the digital displaying units, and programmed to:
   a. store information received from the plurality of computer units concerning wireless ID data from the users of wireless devices;
   b. store information, provided by sponsors, to be displayed on the plurality of digital displaying units and/or to be transmitted to the users of the wireless devices;
   c. collect and filter information of general interest from digital sources, such as Internet; and d. organize stored information, provided by sponsors, to be displayed on the plurality of the digital displaying units and/or to be transmitted to the users of multiplicity of wireless devices and select information from general digital sources in order to selectively feed and eventually reach each one of the plurality of displaying units and/or each of the users of multiplicity of wireless devices, in both cases via its adjacent computer units 100.

A method of for out-of-home proximity marketing and for delivering awareness information of general interest comprises the following steps:

I. Programming a plurality of computer units, geographically dispersed in a plurality of zones with relatively dense and transient population,
   a. each of the plurality of computer units being programmed to receive and transmit information from a central source away from the surrounding area; and
   b. each of the plurality of computer units, being provided with a wireless transceiver, is capable to collect, store and transmit ID data from users of wireless devices provided with a Bluetooth or alike system that is OBEX or similar protocol capable, and are situated in its surrounding area;

II. Providing a plurality of digital displaying units, commensurate in number with the above plurality of computer units; each one of the plurality of said digital displaying units being located adjacent to each one of the plurality of computer units;

III. Providing and programming a central computerized unit for:
   a. receiving and storing the wireless ID data collected, stored, and transmitted by the plurality of computer units;
   b. storing information, provided by sponsors of information and intended to call the attention of the public, to be displayed on the plurality of digital displaying units and/or to be transmitted to the users of the wireless devices;
   c. collecting and filtering information of general interest from digital sources; and
   d. organizing the information resulting from step III (b) and select the information resulted from step III (c) in order to selectively transmit and eventually reach each one of the plurality of displaying units and/or each of the users of said wireless devices, in both cases via its adjacent computer system.

III. BRIEF DESCRIPTION OF THE DRAWING

The subject matter of the invention is particularly pointed out and distinctively claimed in the concluding portion of the specification. The invention, however, both in structure and operation may be better understood by reference to the following description taken in conjunction with the subjoined claims and the accompanying drawing:
a diagrammatic representation of the invention.

IV. DESCRIPTION OF THE PREFERRED EMBODIMENT

The accompanying drawing illustrates a preferred embodiment of a system for out-of-home proximity marketing and for delivering awareness information of general interest, generally designated by numeral 10, which comprises:

A. A plurality of computer units 100 (of conventional type, or custom built to satisfy the requirements of system 10), geographically dispersed in a plurality of zones with relatively high number of transient people, i.e. in high traffic zones such as shopping malls, stadiums, airports, on public transportation means, etc.;
   a. each of the plurality of computer units 100 is programmed to receive and transmit information fed by a central source (further disclosed), away from the above geographically dispersed locations; and
   c. each of the plurality of computer units 100 being provided with a wireless transceiver 110, such as Bluetooth or alike, is capable to collect, store and transmit wireless ID data from users of multiplicity of wireless devices 115, such as mobile phones, personal digital (PDAs), portable computers etc., each of them being OBEX or similar protocol capable and situated in a surrounding area of each of the plurality of computer units 100;

B. A plurality of digital displaying units 120 located outdoor or indoor in proximity of the plurality of computer units 100. Each one of the plurality of digital displaying units 120 is essentially constituted by a relatively large digital billboard, such as, for example, a large high definition LCD or alike and is connected to an adjacent one of the plurality of computer units 100;

The plurality of computer units 100 is so programmed as to identify and collect wireless ID data from the users of wireless devices 115;

C. A central computerized unit 125, located apart from the plurality of computer units 100 and the digital displaying units 120, and programmed to:
   a. store information received from the plurality of computer units 100 concerning wireless ID data from the users of wireless devices 115;
   b. store information, provided by sponsors, to be displayed on the plurality of digital displaying units 120 and/or to be transmitted to the users of the wireless devices 115;
   c. collect and filter information of general interest from digital sources 130, such as Internet; and
   d. organize stored information, provided by sponsors, to be displayed on the plurality of the digital displaying units 120 and/or to be transmitted to the users of multiplicity of wireless devices 115 and select information from general digital sources 130 in order to selectively feed and eventually reach each one of the plurality of displaying units 120 and/or each of the users of multiplicity of wireless devices 115, in both cases via its adjacent computer units 100.

A method of for out-of-home proximity marketing and for delivering awareness information of general interest comprises the following steps:

I. Programming a plurality of computer units, geographically dispersed in a plurality of zones with relatively dense and transient population,
   a. each of said plurality of computer units being programmed to receive and transmit information from a central source away from the surrounding area; and
   b. each of said plurality of computer units, being provided with a wireless transceiver, is capable to collect, store and transmit ID data from users of wireless devices provided with a Bluetooth or alike system, which is OBEX or similar protocol capable, and are situated in its surrounding area;

II. Providing a plurality of digital displaying units, commensurate in number with said plurality of computer units; each one of the plurality of said digital displaying units being located adjacent to each one of said plurality of computer units;

III. Providing and programming a central computerized unit for:
  a. receiving and storing the wireless ID data collected, stored, and transmitted by said plurality of computer units;
  b. storing information, provided by sponsors of information and intended to call the attention of the public, to be displayed on said plurality of digital displaying units and adapted to be transmitted to said users of said wireless devices;
  c. collecting and filtering information of general interest from digital sources; and
  d. organizing the information resulting from step III (b) and select the information resulted from step III (c) in order to selectively transmit and eventually reach each one of said plurality of displaying units and each of said users of said wireless devices, in both cases via an adjacent computer unit of said plurality of computer units.

As required, a detailed embodiment of the present invention is disclosed herein; however, it is to be understood that the disclosed embodiment is merely exemplary of the invention which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure.

The embodiments of the invention in which an exclusive property or privilege is claimed are defined as follows:

1. A system for out-of-home proximity marketing and for delivering awareness information of general interest comprising:

A. A plurality of computer units, geographically dispersed in a plurality of zones with relatively high number of transient people,
  a. each of said plurality of computer units is programmed to receive and transmit information fed by a central source, away from said geographically dispersed locations; and
  b. said computer units transmit information using OBEX and similar protocols which is accepted or rejected by recipients on a per-message basis; and
  c. each of said plurality of computer units being provided with a Bluetooth wireless transceiver is capable to collect, store and transmit wireless ID data from users of a multiplicity of wireless devices, each of the latter being OBEX or similar protocol capable and being situated in a surrounding area of each of said plurality of computer units;

B. A plurality of digital displaying units located in proximity of said plurality of computer units, each one of said plurality of digital displaying units being connected to an adjacent one of said plurality of computer units, said plurality of computer units being programmed to identify and collect wireless ID data from users of said wireless devices;

C. A central computerized unit located apart from said plurality of computer units and said digital displaying units and programmed to:
  a. store said wireless information received from said plurality of computer units concerning wireless ID data from the users of said wireless devices;
  b. store information, provided by sponsors, to be displayed on the plurality of said digital displaying units and adapted to be transmitted to the users of said wireless devices;
  d. collect and filter information of general interest from digital sources, such as Internet; and
  d. organize stored information, provided by sponsors, to be displayed on said plurality of said digital displaying units and to be transmitted to said users of said of multiplicity of wireless devices and select information from said digital sources in order to selectively feed each one of said plurality of displaying units and eventually reach each one of said users of said multiplicity of wireless devices, in both cases via its adjacent one of said plurality of computer units, in both cases via its adjacent one of said plurality of computer units.

* * * * *

UNITED STATES PATENT AND TRADEMARK OFFICE
CERTIFICATE OF CORRECTION

PATENT NO.      : 8,781,887 B2                                    Page 1 of 1
APPLICATION NO. : 11/986650
DATED           : July 15, 2014
INVENTOR(S)     : Law et al.

It is certified that error appears in the above-identified patent and that said Letters Patent is hereby corrected as shown below:

TITLE PAGE: ITEM 76 should be changed to 75

TITLE PAGE: ITEM 73 insert -- ISIGN MEDIA CORPORATION, West Vancouver, B.C., Canada --

Signed and Sealed this
Twenty-fourth Day of March, 2015

Michelle K. Lee
*Director of the United States Patent and Trademark Office*